(12) United States Patent
Ong et al.

(10) Patent No.: US 11,122,099 B2
(45) Date of Patent: Sep. 14, 2021

(54) DEVICE, SYSTEM AND METHOD FOR PROVIDING AUDIO SUMMARIZATION DATA FROM VIDEO

(71) Applicant: MOTOROLA SOLUTIONS, INC., Chicago, IL (US)

(72) Inventors: Yan Pin Ong, Pulau Pinang (MY); Fan Sin Khew, Perak (MY); Wei Sheng Chin, Pulau Pinang (MY); ZhenYang Ong, Pulau Pinang (MY); Chiew Yeong Ng, Perak (MY); Choon Chiat Khor, Pulau Pinang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 133 days.

(21) Appl. No.: 16/205,786

(22) Filed: Nov. 30, 2018

(65) Prior Publication Data

US 2020/0177655 A1 Jun. 4, 2020

(51) Int. Cl.
*H04L 29/06* (2006.01)
*G10L 25/48* (2013.01)
(Continued)

(52) U.S. Cl.
CPC .......... *H04L 65/601* (2013.01); *G10L 25/27* (2013.01); *G10L 25/48* (2013.01); *H04N 7/06* (2013.01);
(Continued)

(58) Field of Classification Search
CPC ......... G10L 25/27; G10L 25/48; H04L 65/80; H04L 65/601; H04L 65/602; H04L 65/1059; H04L 65/1083; H04L 65/4069; H04N 21/631; H04N 21/2743; H04N 21/4394; H04N 21/44008; H04N 21/8549; H04N 21/44245; H04N 7/06; H04N 7/181; H04N 7/183; G06K 9/00771; G06K 9/00671; G06K 9/00751; G06K 9/00711;
(Continued)

(56) References Cited

U.S. PATENT DOCUMENTS 8,862,173 B2 10/2014 Marocchi et al.
9,495,783 B1 * 11/2016 Samarasekera ......... G06T 11/60
(Continued)

OTHER PUBLICATIONS

ISA/EP, International Serach Report and Written Opinion, dated Mar. 13, 2020 re PCT International Patent Application No. PCT/US2019/062347.

*Primary Examiner* — Kostas J Katsikis
(74) *Attorney, Agent, or Firm* — Perry + Currier, Inc.

(57) ABSTRACT

An example device: transmits, to one or more receiving terminals, first frames of video captured by a video camera; determines, after transmission of the first frames of the video, that a signal strength associated with the first network falls below a predetermined threshold; generates audio summarization data corresponding to one or more objects of interest identified in second frames of the video, the second frames captured by the video camera after the first frames; selects a portion of the audio summarization data based on a context associated with a receiving terminal of the one or more receiving terminals; and transmits, using the communication unit, via one or more of the first network and a second network, the portion of the audio summarization data to the receiving terminal.

16 Claims, 6 Drawing Sheets

(51) Int. Cl.
  *G10L 25/27* (2013.01)
  *H04N 7/06* (2006.01)
  *H04N 7/18* (2006.01)
  *G06K 9/00* (2006.01)
(52) U.S. Cl.
  CPC ......... *H04N 7/181* (2013.01); *G06K 9/00771* (2013.01)
(58) Field of Classification Search
  CPC ................... G08B 1/08; G08B 13/194; G08B 13/19671
  See application file for complete search history.

(56) References Cited

U.S. PATENT DOCUMENTS

| | | | |
|---|---|---|---|
| 9,756,294 B2 | 9/2017 | Saptharishi | |
| 9,774,911 B1* | 9/2017 | Thomas | H04N 21/234 |
| 10,225,621 B1* | 3/2019 | Newell | H04N 21/23412 |
| 10,306,059 B1* | 5/2019 | Bondareva | H04M 3/5166 |
| 10,313,756 B2* | 6/2019 | Panchaksharaiah | H04N 21/4667 |
| 10,412,318 B1* | 9/2019 | Ong | H04N 5/272 |
| 10,412,630 B2 | 9/2019 | Olson | H04W 28/08 |
| 10,645,464 B2* | 5/2020 | Newell | H04N 21/4307 |
| 10,674,208 B2* | 6/2020 | Thomas | H04N 21/435 |
| 2006/0050794 A1* | 3/2006 | Tan | H04N 21/242 375/240.26 |
| 2009/0208118 A1* | 8/2009 | Csurka | G06K 9/3233 382/228 |
| 2009/0226043 A1* | 9/2009 | Angell | G06K 9/00771 382/115 |
| 2010/0104261 A1 | 4/2010 | Liu et al. | |
| 2010/0171886 A1* | 7/2010 | Anderson | H04N 21/4852 348/732 |
| 2010/0253689 A1* | 10/2010 | Dinicola | H04N 7/147 345/467 |
| 2012/0259950 A1 | 10/2012 | Havekes et al. | |
| 2012/0281969 A1 | 11/2012 | Jiang et al. | |
| 2013/0101002 A1 | 4/2013 | Gettings | |
| 2013/0124984 A1* | 5/2013 | Kuspa | H04N 21/4307 715/255 |
| 2014/0063237 A1* | 3/2014 | Stone | H04N 7/181 348/143 |
| 2014/0297054 A1* | 10/2014 | Tsai | H02J 3/14 700/295 |
| 2016/0182850 A1* | 6/2016 | Thompson | H04N 1/00106 348/158 |
| 2016/0205422 A1 | 7/2016 | Saptharishi | |
| 2016/0378443 A1* | 12/2016 | Sun | G06F 21/53 717/140 |
| 2017/0059265 A1* | 3/2017 | Winter | H04N 5/91 |
| 2017/0076571 A1* | 3/2017 | Borel | G08B 13/19673 |
| 2017/0078767 A1* | 3/2017 | Borel | G06K 9/00758 |
| 2017/0169816 A1* | 6/2017 | Blandin | G10L 15/08 |
| 2017/0199934 A1* | 7/2017 | Nongpiur | G10L 25/51 |
| 2017/0230605 A1* | 8/2017 | Han | H04N 7/185 |
| 2017/0277784 A1* | 9/2017 | Hay | H04L 65/403 |
| 2017/0301109 A1* | 10/2017 | Chan | G06T 7/73 |
| 2017/0364586 A1* | 12/2017 | Krishnamurthy | G06F 16/3329 |
| 2017/0364587 A1* | 12/2017 | Krishnamurthy | G06F 40/284 |
| 2018/0204066 A1* | 7/2018 | Huang | G06K 9/00718 |
| 2018/0330238 A1* | 11/2018 | Luciw | G06N 3/0445 |
| 2018/0332503 A1* | 11/2018 | Olson | H04L 43/10 |
| 2018/0376294 A1* | 12/2018 | Tian | G06K 9/00671 |
| 2019/0020905 A1* | 1/2019 | Bennett | H04N 21/47217 |
| 2019/0050238 A1* | 2/2019 | Lim | H04W 4/38 |
| 2019/0069023 A1* | 2/2019 | Thomas | G10L 25/51 |
| 2019/0087662 A1* | 3/2019 | Zhao | H04N 7/188 |
| 2019/0096067 A1* | 3/2019 | Jin | G06T 7/11 |
| 2019/0122082 A1* | 4/2019 | Cuban | H04N 21/251 |
| 2019/0149688 A1* | 5/2019 | Flowerday | G06F 16/435 713/176 |
| 2019/0155833 A1* | 5/2019 | Flowerday | G06F 1/163 |
| 2019/0158788 A1* | 5/2019 | McBride | H04L 67/36 |
| 2019/0191224 A1* | 6/2019 | Newell | G06F 40/40 |
| 2019/0327183 A1* | 10/2019 | Ward | H04L 47/80 |
| 2019/0356934 A1* | 11/2019 | MacDonald | H04N 7/188 |
| 2020/0042797 A1* | 2/2020 | Lee | G06K 9/00718 |
| 2020/0105111 A1* | 4/2020 | Messer | H04N 7/188 |
| 2020/0142567 A1* | 5/2020 | Lim | G06F 16/54 |
| 2020/0152186 A1* | 5/2020 | Koh | G10L 15/08 |
| 2020/0177655 A1* | 6/2020 | Ong | G06K 9/00671 |

* cited by examiner

DEVICE, SYSTEM AND METHOD FOR PROVIDING AUDIO SUMMARIZATION DATA FROM VIDEO

BACKGROUND OF THE INVENTION

Public safety personnel, such as police officers, often wear body cameras that collect and stream video to receiving terminals, for example to share the video in real-time in mission critical situations. However, such sharing may rely on a broadband strength of a communication network which may be unreliable. For example a reduction in broadband strength may lead to a reduction in video quality and/or a loss of the video, which can leave a police officer isolated in a potentially challenging situation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
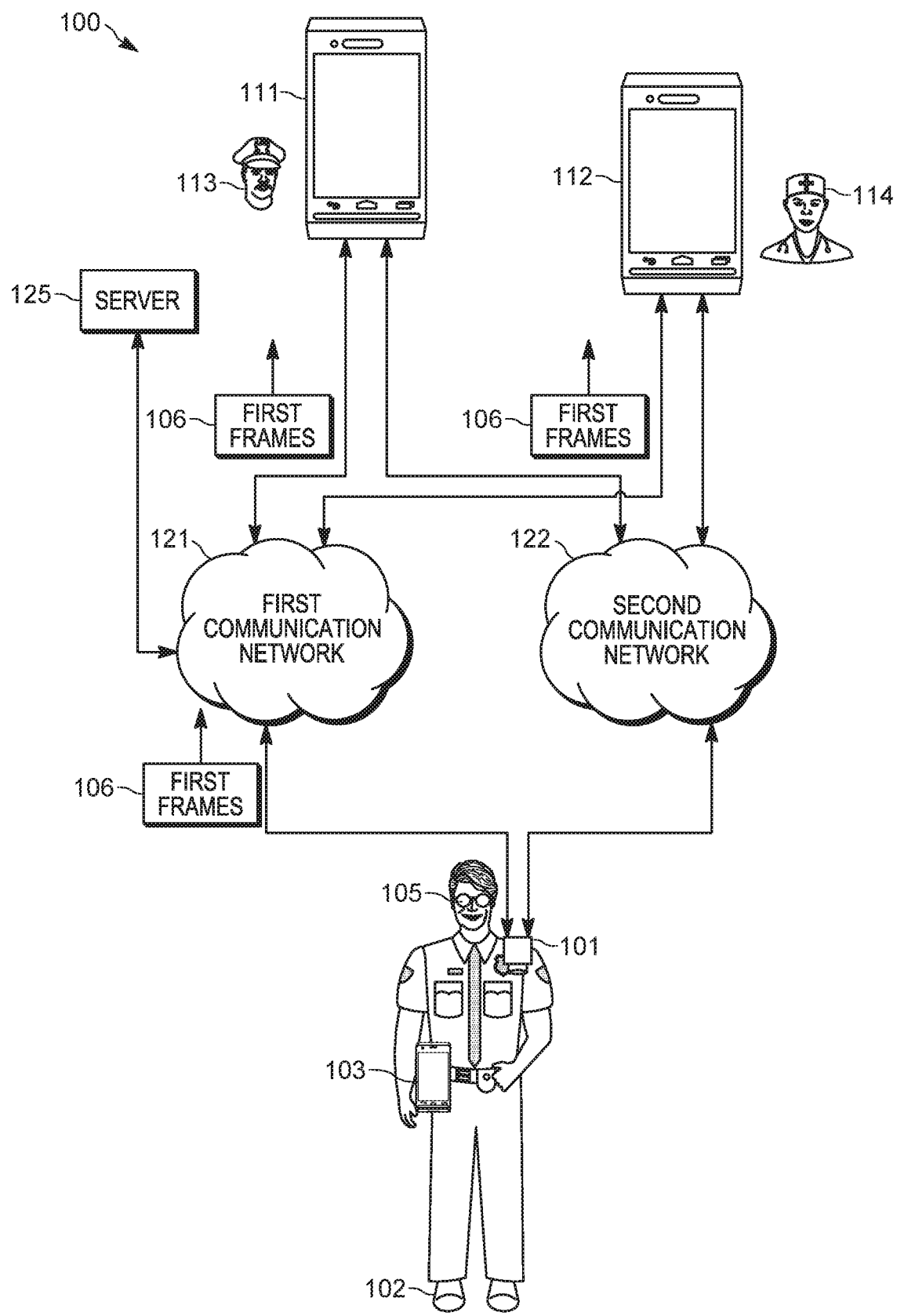
FIG. 1 is a system for providing audio summarization data from video, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Another aspect of the specification provides a method of operating a portable media streaming device, the method comprising: transmitting, via a first network, using the portable media streaming device, to one or more receiving terminals, first frames of video captured by the portable media streaming device; determining, at the portable media streaming device, after transmission of the first frames of the video, that a signal strength associated with the first network falls below a predetermined threshold; generating, at the portable media streaming device, audio summarization data corresponding to one or more objects of interest identified in second frames of the video captured after the first frames; selecting, at the portable media streaming device, a portion of the audio summarization data based on a context associated with a receiving terminal of the one or more receiving terminals; and transmitting, via one or more of the first network and a second network, at the portable media streaming device, the portion of the audio summarization data to the receiving terminal.

Another aspect of the specification provides a portable media streaming device comprising: a communication unit configured to communicate with a first network and a second network; and a controller in communication with a video camera, the controller configured to: transmit, using the communication unit, via the first network, to one or more receiving terminals, first frames of video captured by the video camera; determine, after transmission of the first frames of the video, that a signal strength associated with the first network falls below a predetermined threshold; generate audio summarization data corresponding to one or more objects of interest identified in second frames of the video, the second frames captured by the video camera after the first frames; select a portion of the audio summarization data based on a context associated with a receiving terminal of the one or more receiving terminals; and transmit, using the communication unit, via one or more of the first network and a second network, the portion of the audio summarization data to the receiving terminal.

Attention is directed to FIG. 1, which depicts an example system 100 for providing audio summarization data from video, in accordance with some examples. The system 100 comprises a portable media streaming device 101, which, as depicted, comprise a video camera, and the like, and specifically a mobile body-worn camera worn by a user 102, such as a public safety officer and/or police officer. However, in other examples, the user 102 may not be a public safety officer and/or police officer; for example, the user 102 may be an employee of an entity and/or a company associated with the portable media streaming device 101. As depicted in FIG. 1, the user 102 is further wearing a mobile communication device 103 and smart glasses 105, each of which may also comprise a respective portable media streaming device.

In some examples, the portable media streaming device 101 may be a stand-alone video source and/or body-worn camera, or integrated with a remote speaker microphone and/or another device worn by the user 102, including, but not limited to, one or more of the mobile communication device 103 and the smart glasses 105.

In some examples, the portable media streaming device 101, the mobile communication device 103 and the smart glasses 105 may form a personal area network (PAN), with the mobile communication device 103 acting as a hub of the PAN, such that the portable media streaming device 101 (and/or the smart glasses 105) stream video via the mobile communication device 103, and the like, to receiving terminals via one or more networks.

Indeed, as depicted, the system 100 further comprises one or more receiving terminals 111, 112 operated, respectively, by users 113, 114. The system 100 further comprises a first communication network 121 and a second communication network 122. The first communication network 121 and the second communication network 122 will be interchangeable referred to hereafter, respectively, as the first network 121 and the second network 122 and collectively as the networks 121, 122.

As depicted, each of the receiving terminals 111, 112 comprises a respective mobile communication device, similar to the mobile communication device 103; however, each of the receiving terminals 111, 112 may be any device configured to receive and play video including, but not limited to, mobile devices and fixed and/or non-mobile devices (e.g. computers, dispatcher terminals, and the like).

As depicted, the portable media streaming device 101 is transmitting and/or streaming first frames 106 of a video to the receiving terminals 111, 112 via the first network 121, which may be a higher bandwidth network than the second network 122.

For example, the first network 121 may comprise a broadband network such as a Long Term Evolution (LTE) network, and the like, while the second network 122 may comprise narrowband network, such as a land mobile-radio (LMR) network, and the like (which is generally of lower bandwidth than LTE networks).

Regardless, the portable media streaming device 101 and the receiving terminals 111, 112 are each generally configured to communicate with both the networks 121, 122 via respective communication links, depicted in FIG. 1 as double-ended arrows between the networks 121, 122 and each of the portable media streaming device 101 and the receiving terminals 111, 112. The communication links with the portable media streaming device 101 are generally at least partially wireless, while the communication links with the receiving terminals 111, 112 may be wired and/or wireless as desired, and may depend on whether a receiving terminal 111, 112 is mobile or non-mobile.

Furthermore, while two receiving terminals 111, 112 are depicted, the system 100 may comprise as few as one receiving terminal, and more than two receiving terminals, some of which may be mobile and others may be fixed, which may depend on a number of users (e.g. the users 113, 114) deployed in the system 100 and/or working with the user 102.

Furthermore, as depicted, each of the receiving terminals 111, 112 may be associated with different contexts. For example, as depicted, the user 113 of the receiving terminal 111 is a police officer, and hence the receiving terminal 111 may be associated with a context of a police officer; similarly, as depicted, the user 114 of the receiving terminal 112 is a paramedic, and hence the receiving terminal 112 may be associated with a context of a paramedic.

Indeed, the contexts of the receiving terminals 111, 112 may be based on roles (e.g. a job title and/or a rank) of their respective users 113, 114. For example, the user 113 may have a role as a police officer or captain in a police force, and the user 114 may have a role as a paramedic or critical care paramedic (and/or emergency medical technician), and the context of the receiving terminals 111, 112 may be based on such roles.

The portable media streaming device 101 is generally configured to determine a context of the receiving terminals 111, 112. In some examples, the portable media streaming device 101 may determine context of the receiving terminals 111, 112 by receiving a respective context from each of the receiving terminals 111, 112. In other examples, as depicted, the system 100 may further comprise a server 125 associated with the one or more receiving terminals 111, 112, the server 125 in communication with the first network 121; the server 125 may comprise a computer aided dispatch server and/or a server storing records of the receiving terminals 111, 112. Regardless, the server 125 may provide the context of the receiving terminals 111, 112 to the portable media streaming device 101 via the first network 121 (and/or another network, such as the second network 122).

As will be explained hereafter, the portable streaming device 101 is generally configured to switch from transmitting video to the receiving terminals 111, 112 to transmitting audio summarization data of the video the receiving terminals 111, 112 when a signal strength associated with the first network 121 falls below a predetermined threshold. The audio summarization data may be transmitted via either of the networks 121, 122, though the second network 122 may be used, for example as a default, as the signal strength associated with the first network 121 falling below the predetermined threshold may indicate that the first network 121 is unreliable and/or unavailable for transmitting audio summarization data.

Furthermore, the audio summarization transmitted can be less than the audio summarization data generated, based on context of each of the receiving terminals 111, 112. For example, the audio summarization data can correspond to one or more objects of interest identified in second frames of the video captured after the first frames 106, and the context of the receiving terminal 111 may be that the role of the user 113 is a "Police Officer"; hence, the audio summarization data transmitted to the receiving terminal 111 may be audio summarization data of objects of interest associated with police officers. When the audio summarization data is received at the receiving terminal 111, the audio summarization data is "played" at a speaker of the receiving terminal 111 to provide the user 113 with an audio summary of video captured by the portable media streaming device 101 that is relevant to police officers.

Similarly, the audio summarization data can correspond to one or more objects of interest identified in second frames of the video captured after the first frames 106, and the context of the receiving terminal 112 may be that the role of the user 114 is a "Paramedic"; hence, the audio summarization data transmitted to the receiving terminal 112 may be audio summarization data of objects of interest associated with paramedics. When the audio summarization data is received at the receiving terminal 112, the audio summarization data is "played" at a speaker of the receiving terminal 112 to provide the user 114 with an audio summary of video captured by the portable media streaming device 101 that is relevant to paramedics.

Hence, for example, audio summarization data transmitted to the receiving terminal 111 may include audio description of objects in the video associated with police officers, whereas audio summarization data transmitted to the receiving terminal 112 may include audio description of objects in the video associated with paramedics.

However, in other examples, audio summarization data transmitted to each of the receiving terminals 111, 112 may be the same, but transmitted with respective identifiers of context of the receiving terminals 111, 112, the respective identifiers used by the receiving terminals 111, 112 to filter a respective portion of the audio summarization data at each of the receiving terminals 111, 112. For example, audio summarization data transmitted to the receiving terminal 111 could be transmitted with an identifier "Police Officer", and the like, to cause the receiving terminal 111 to filter the audio summarization data to "play" the portion of the audio summarization data relevant to police officers. Similarly, audio summarization data transmitted to the receiving terminal 112 could be transmitted with an identifier "Paramedic", and the like, to cause the receiving terminal 112 to filter the audio summarization data to "play" the portion of the audio summarization data relevant to paramedics.

Figure 2:
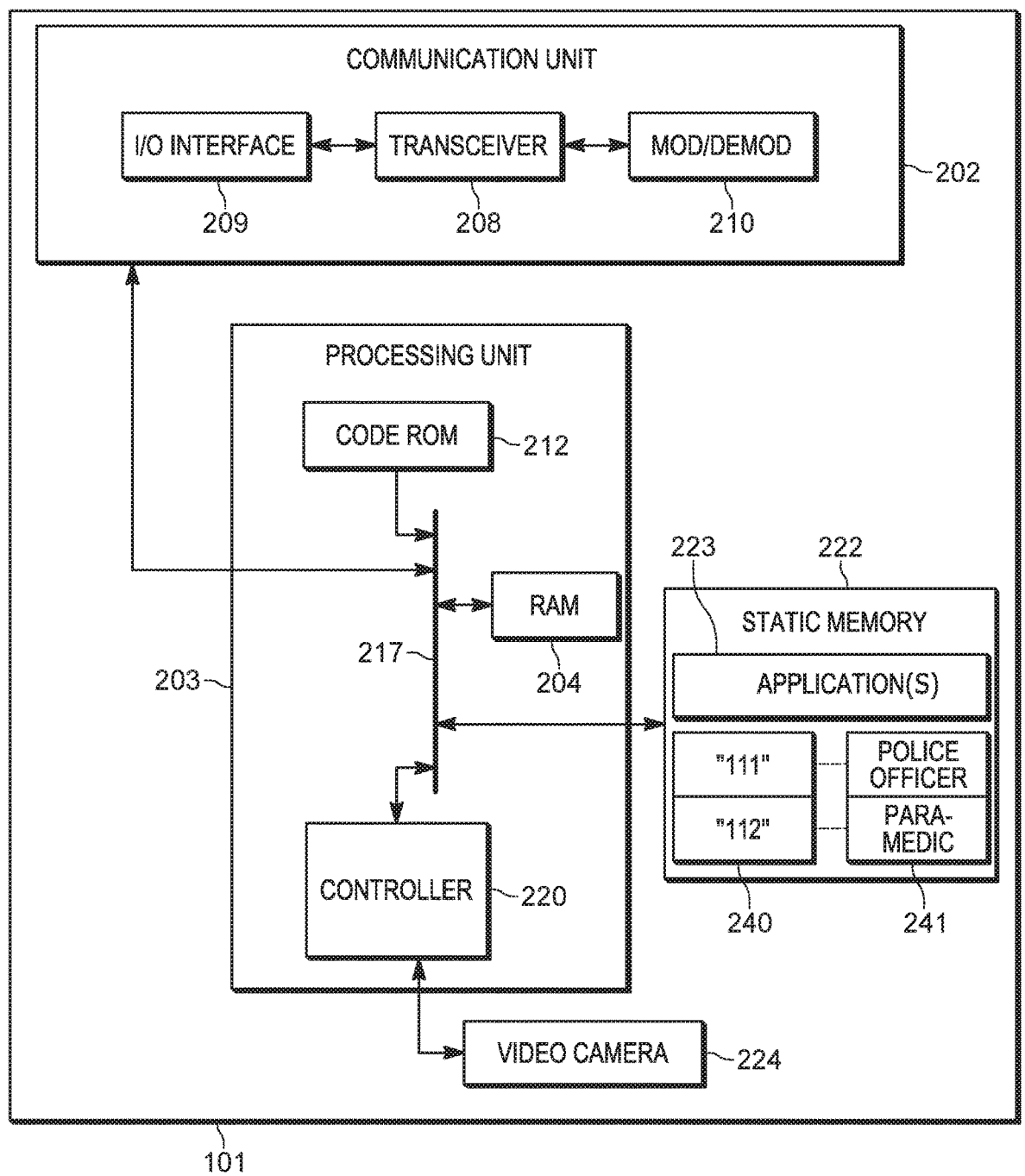
FIG. 2 is a device diagram showing a device structure of a portable media streaming device for providing audio summarization data from video, in accordance with some examples.

Attention is next directed to FIG. 2, which depicts a schematic block diagram of an example of the portable streaming device 101.

In general, the portable streaming device 101 comprises: a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing at least one application 223, and a video camera 224. Hereafter, the at least one application 223 will be interchangeably referred to as the application 223. Furthermore, each of the memories 212, 222 comprise non-transitory memories and/or non-transitory computer readable mediums. While not depicted, the portable streaming device 101 may further comprise one or more input devices, one or more display screens, and the like.

As shown in FIG. 2, the portable streaming device 101 includes the communications unit 202 coupled to the common data and address bus 217 of the processing unit 203.

The video camera 224 comprises any suitable camera configured to capture frames of video in a field of view of a lens system of the video camera 224.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 may include one or more wired and/or wireless input/output (I/O) interfaces 209 that are configurable to communicate with other communication devices. For example, the communication unit 202 may include one or more transceivers 208 and/or wireless transceivers for communicating with the networks 121, 122. For example, one or more transceivers 208 may comprise a broadband transceiver for communicating with the network 121 and which may include, but is not limited to, an LTE (Long-Term Evolution) transceiver and/or other types of GSM (Global System for Mobile communications) transceivers and/or another similar type of wireless transceiver.

Similarly, one or more transceivers 208 may comprise a narrowband transceiver for communicating with the network 122 and which may include, but is not limited to one or more of a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), a Worldwide Interoperability for Microwave Access (WiMAX) transceiver, for example operating in accordance with an IEEE 802.16 standard, and/or another similar type of wireless transceiver.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components (e.g. the video camera 224, and the like). Indeed, the video camera 224 may be located external to the portable streaming device 101 and in communication with the portable streaming device 101 via such a port.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the portable streaming device 101 is not a generic controller and/or a generic device, but a device specifically configured to implement functionality for providing audio summarization data from video. For example, in some examples, the portable streaming device 101 and/or the controller 220 specifically comprises a computer executable engine configured to implement functionality for providing audio summarization data from video.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the portable streaming device 101 as described herein are maintained, persistently, at the memory 222 and used by the controller 220, which makes appropriate utilization of volatile storage during the execution of such programming instructions.

Figure 3:
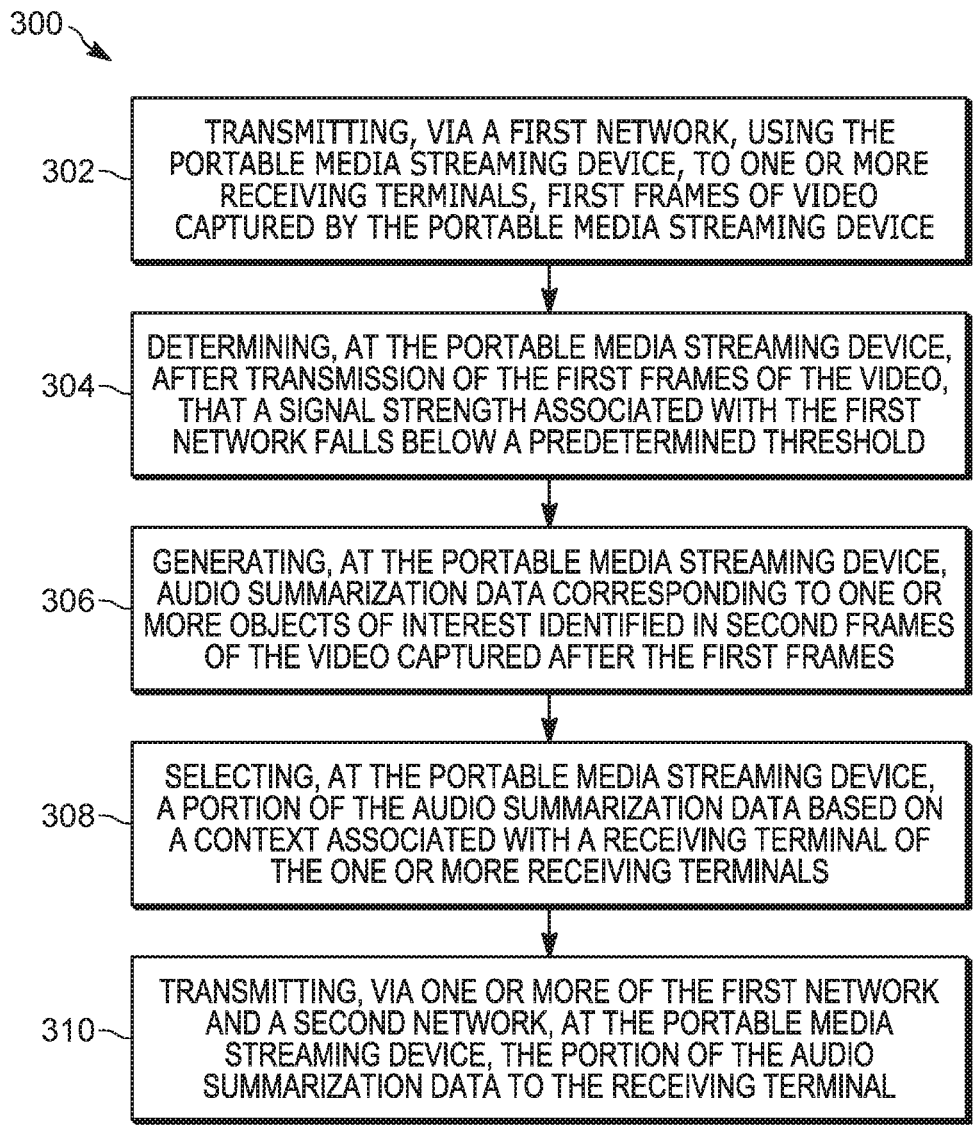
FIG. 3 is a flowchart of a method for providing audio summarization data from video, in accordance with some examples.

In particular, the memory 222 stores instructions corresponding to the at least one application 223 that, when executed by the controller 220, enables the controller 220 to implement functionality for providing audio summarization data from video including, but not limited to, the blocks of the method set forth in FIG. 3. In illustrated examples, when the controller 220 executes the one or more applications 223, the controller 220 is enabled to: transmit, via the first network 121, to one or more receiving terminals 111, 112, the first frames 106 of video captured by the portable media streaming device 101 (e.g. by the video camera 224); determine, after transmission of the first frames 106 of the video, that a signal strength associated with the first network 121 falls below a predetermined threshold; generate audio summarization data corresponding to one or more objects of interest identified in second frames of the video captured after the first frames 106; select a portion of the audio summarization data based on a context associated with a receiving terminal of the one or more receiving terminals 111, 112; and transmit, via one or more of the first network 121 and the second network 122 the portion of the audio summarization data to the receiving terminal.

For example, as also depicted in FIG. 2, the memory 222 may further store identifiers 240 of each of the receiving terminals 111, 112 (e.g. "111" and "112") each stored in association with respective identifiers of context 241 defining context of each of the receiving terminals 111, 112 (e.g. "Police Officer" and "Paramedic"). The identifiers 240 and the identifiers of context 241 may be preconfigured at the memory 222 and/or received from each respective receiving terminal 111, 112 and/or received from the server 125 and/or determined using machine learning algorithms, and the like. While each of the identifiers 240 is depicted as alphanumeric text, each of the identifiers 240 may include, but is not limited to, one or more of network address of a respective receiving terminal 111, 112 (e.g. used to transmit video to the receiving terminals 111, 112), a Media Access Control address of a respective receiving terminal 111, 112, and the like.

The application 223 may include machine learning and/or deep-learning based algorithms, and the like, which have been trained and/or configured to determine a context of a receiving terminal (e.g. based on audio and/or video and/or other data received from the receiving terminal). Such machine learning and/or deep-learning based algorithms may further have been trained and/or configured to identify objects of interest in video. Such machine learning and/or deep-learning based algorithms may further have been trained and/or configured to generate audio summarization data corresponding to one or more objects of interest identified in video. Such machine learning and/or deep-learning based algorithms may further have been trained and/or configured to select a portion of audio summarization data based on a context of a receiving terminal to which the audio summarization data is to be transmitted. Indeed, such machine learning and/or deep-learning based algorithms may further have been trained and/or configured to implement any suitable functionality of the portable media streaming device 101 including functionality related to providing audio summarization data from video.

The one or more machine learning algorithms and/or deep learning algorithms of the application 223 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm and/or deep learning algorithm is within the scope of present examples.

Furthermore, the application 223 may include, but are not limited to, algorithms for one or more of: identifying one or more objects of interest using one or more of video analytics on frames of a video and audio analytics on audio of the frames of the video. Such algorithms may include, but are not limited to, one or more of: video analytics algorithms, audio analytics algorithms object-matching analytics algorithms, action-matching analytics algorithms, two-dimensional image matching, three-dimensional model matching, and the like. Indeed, the application 223 may include any suitable algorithm to identify one or more objects of interest in frames of a video including, but not limited to, algorithms that use descriptions (e.g. textual descriptions, and the like) of objects of interest to search for corresponding objects of interest in frames of a video, and the like.

While details of the receiving terminals 111, 112 are not depicted, each of the receiving terminals 111, 112 may have components similar to the portable streaming device 101 adapted, however, for the functionality of the receiving terminals 111, 112; for example, each the receiving terminals 111, 112 may have a communication unit, controller and the like adapted to receive video and audio summarization data via the networks 121, 122. Furthermore, each of the receiving terminals 111, 112 generally includes a display screen and a speaker to respectively provide video and audio summarization data received from the portable media streaming device 101.

Attention is now directed to FIG. 3, which depicts a flowchart representative of a method 300 for providing audio summarization data from video. The operations of the method 300 of FIG. 3 correspond to machine readable instructions that are executed by the portable media streaming device 101, and specifically the controller 220 of the portable media streaming device 101. In the illustrated example, the instructions represented by the blocks of FIG. 3 are stored at the memory 222 for example, as the application 223. The method 300 of FIG. 3 is one way in which the controller 220 and/or the portable media streaming device 101 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 transmits, via the first network 121, to one or more receiving terminals 111, 112, the first frames 106 of video captured by the portable media streaming device 101 (e.g. by the video camera 224). In particular, with brief reference to FIG. 1, the transmission of the first frames 106 is an example of the block 302 of the method 300.

In some examples, the users 113, 114 may be colleagues and/or on a team and/or members of a talkgroup with the user 102, and/or the portable media streaming device 101 and the receiving terminals 111, 112 may be associated with each other, and/or assigned to a same incident, for example a public safety incident, and the like, by a dispatcher. The user 102 may be the first responder, and the like, at the scene of the incident and may stream video from the portable media streaming device 101 to the receiving terminals 111, 112 such that the users 113, 114, who may be on route to the incident, are provided with at least the first frames 106 of video such that the users 113, 114 know what to expect when they arrive at the incident. As the portable media streaming device 101 is streaming video, the portable media streaming device 101 may select the first network 121 to stream the video, as the first network 121 has a higher bandwidth than the second network 122.

At a block 304, the controller 220 determines, after transmission of the first frames 106 of the video, that a signal strength associated with the first network 121 falls below a predetermined threshold. For example, the user 102 and the portable media streaming device 101 may enter a low bandwidth region of the first network 121 and/or the first network 121 may experience technical difficulties and/or high traffic resulting in a drop in signal strength. The signal strength associated with the first network 121 falling below a predetermined threshold may be determined by the controller 220 and/or the portable media streaming device 101 determining a received signal strength intensity (RSSI) of the first network 121, and comparing the RSSI with the predetermined threshold. Furthermore, the predetermined threshold may be preconfigured at the application 223 and selected based on an RSSI where transmitted video degrades in quality and/or is slow to transmit and the like. Furthermore, the RSSI may be measured via the one or more transceivers 208 and/or the communication unit 202.

At a block 306, the controller 220 generates audio summarization data corresponding to one or more objects of interest identified in second frames of the video captured after the first frames 106. The second frames may be captured before and/or after the signal strength associated with the first network 121 falls below the predetermined threshold.

Furthermore, the controller 220 may identify the one or more objects of interest using one or more of video analytics on the second frames and audio analytics on audio of the second frames. For example, the one or more objects of interest may include, but are not limited to one or more of a person, a given object, and an entity, and the like. In particular, the object of interest may be identified according to the identifiers of the contexts 241; for example, guns in the second frames may be identified and associated with a "Police Officer" context, while a suspect that is lying on the ground injured may be identified and associated with a "Police Officer" context and/or a "Paramedic" context.

At a block 308, the controller 220 selects a portion of the audio summarization data based on a context associated with a receiving terminal of the one or more receiving terminals 111, 112. For example, the context may be determined based on the identifiers 240 of the receiving terminals 111, 112, and the associated identifiers of the context 241.

As described above, the context may comprise a role, and the like associated with a user 113, 114 of a receiving terminal 111, 112. Furthermore, the controller 220 may be configured to receive, via the first network 121, from the server associated with the one or more receiving terminals 111, 112, prior to the signal strength associated with the first network 121 falling below the predetermined threshold, a context of the receiving terminals 111, 112. Alternatively, the context may be received from the receiving terminals 111, 112 and/or using one or more machine learning algorithms, as described above.

Hence, as described above, guns described in a first portion of the audio summarization data may be associated with a "Police Officer" context, while a suspect that is lying on the ground injured described in a first portion of the audio summarization data may be associated with a "Police Officer" context and/or a "Paramedic" context.

At a block 310, the controller 220 transmits, via one or more of the first network 121 and the second network 122 the portion of the audio summarization data to a receiving terminal 111, 112.

In particular, in some examples, the portion of the audio summarization data selected at the block 308 may comprise an identifier of the context 241 (e.g. of a receiving terminal 111, 112 to which the portion of the audio summarization data is to be transmitted. In these examples, at the block 310, the controller 220 may transmit, via one or more of the first network 121 and the second network 122 the portion of the audio summarization data to all of the one or more receiving terminals 111, 112, the identifier of the context 241 being configured for use in filtering the portion of the audio summarization data at each of the one or more receiving terminals 111, 112. For examples, portions of the audio summarization data associated with police officers may be played at the receiving terminal 111, while portions of the audio summarization data associated with paramedics may be played at the receiving terminal 112. In other examples, the audio summarization data may be transmitted with context identified via machine learning algorithms and the like.

In yet further examples, at the block 308, the controller 220 may select respective portions of the audio summarization data based on a respective context associated with respective receiving terminals 111, 112 of the one or more receiving terminals 111, 112. In these examples, at the block 310, the controller 220 may transmit, via one or more of the first network 121 and the second network 122, the respective portions of the audio summarization data to the respective receiving terminals 111, 112. For example, at least two of the one or more receiving terminals 111, 112 may have different respective contexts (e.g. as depicted in FIG. 1 and FIG. 2) such that at least two of the respective portions of the audio summarization data are different from one another. In particular, each of the respective portions of the audio summarization data may be customized according to respective contexts of the respective receiving terminals 111, 112.

Hence, as describe above, a portion of the audio summarization data associated with police officers may be transmitted to the receiving terminal 111, while portion of the audio summarization data associated with paramedics may transmitted to the receiving terminal 112.

In particular examples, the first network 121 may comprise a broadband network and the second network 122 may comprises a narrowband network, the first frames 106 of the video may be transmitted via the broadband network prior to the signal strength associated with the first network 121 falling below the predetermined threshold, and the portion of the audio summarization data may be transmitted to a receiving terminal 111, 112 via the narrowband network after the signal strength associated with the first network 121 falls below the predetermined threshold.

Figure 4:
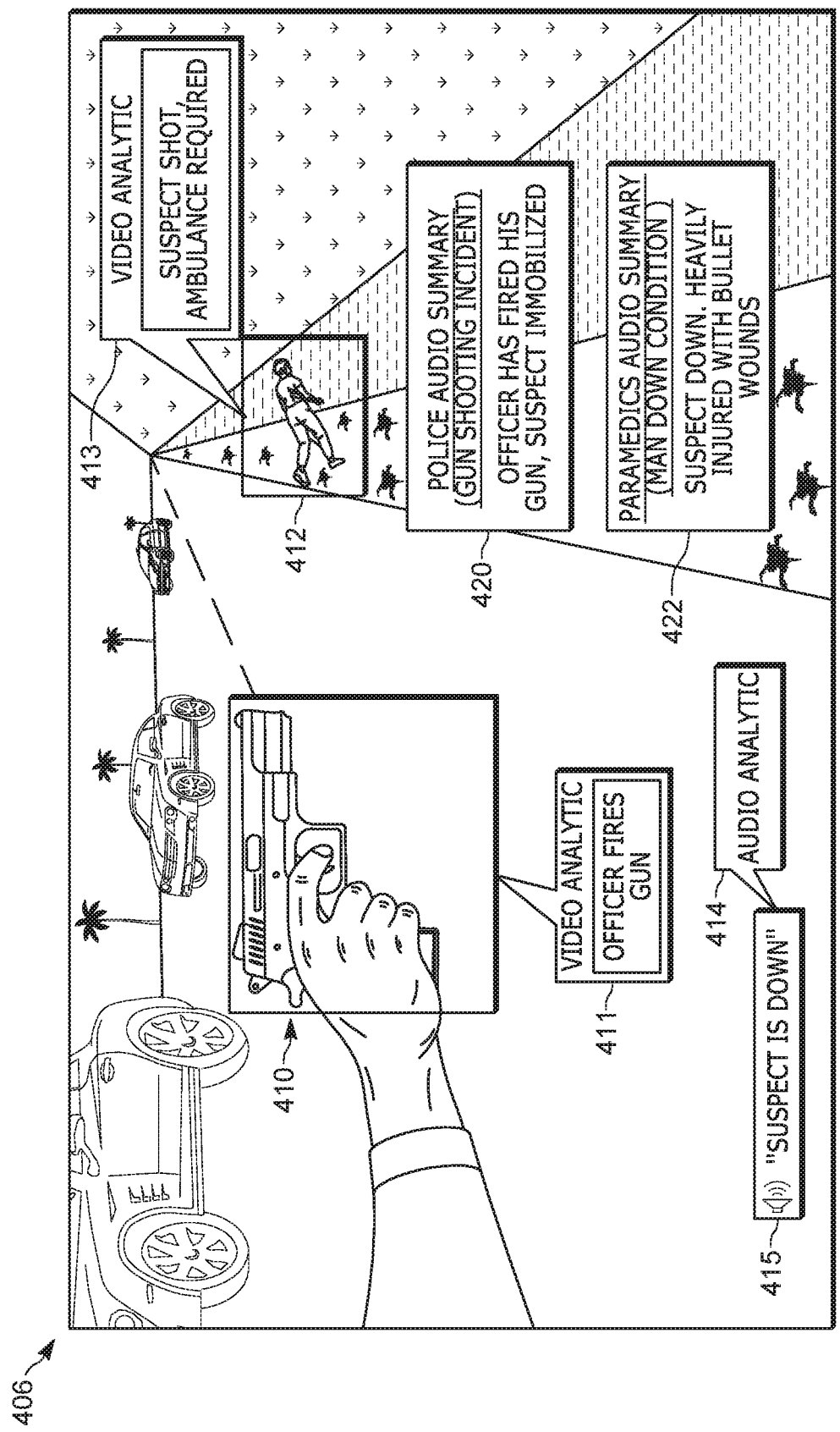
FIG. 4 depicts generation of audio summarization data form video at a portable media streaming of the system of FIG. 1, to show an example of a method for providing audio summarization data from video, in accordance with some examples.

Attention is next directed to FIG. 4. which depicts an example of the blocks 306, 308 of the method 300. In particular, FIG. 4 depicts an example second frame 406 (e.g. of a plurality of second frames) of the video captured by the portable media streaming device 101 after the first frames 106 are captured. In particular, the second frame 406 comprises an image captured by the video camera 224 of the portable media streaming device 101 and which is being analyzed via the controller 220 implementing the application 223.

As depicted, the controller 220 has determined that the second frame 406 includes objects of interest that include a gun 410 that has been fired. For example, as depicted, the gun 410 is identified via video analytics 411 that identifies that the user 102 (e.g. a police officer) has fired the gun (e.g. the video analytics 411 identifies "Officer fires gun").

As further depicted, the controller 220 has determined that the second frame 406 includes objects of interest that include a suspect 412 that has been shot. For example, as depicted, the suspect 412 is identified as being shot via video analytics 413 that identifies "Suspect Shot, Ambulance Required". Similarly, the suspect 412 having been shot may be further identified based on audio analytics 414 of audio 415 spoken by the user 102 (e.g. "Suspect Is Down") and that is included in the second frames of the video (including the depicted example second frame 406).

As further depicted in FIG. 4, the controller 220 generates (e.g. at the block 306 of the method 300) audio summarization data 420 that corresponds to the gun 410 and the suspect 412, and audio summarization data 422 that corresponds to the suspect 412.

While the audio summarization data 420, 422 is depicted as text in FIG. 4, the audio summarization data 420, 422 generally comprises audio data (e.g. "MP3" data and the like) that describes the respective objects of interest.

Furthermore, each of the audio summarization data 420, 422 has been categorized based on context. For example, the audio summarization data 420 comprises "Officer has fired his gun, suspect immobilized", and the audio summarization data 420 has been categorized as "Police Audio Summary (Gun Shooting Incident)", which relates to a context of a "Police Officer". Similarly, the audio summarization data 422 comprises "Suspect down, Heavily injured with bullet wounds", and the audio summarization data 422 has been categorized as "Paramedic Audio Summary (Man Down Condition)", which relates to a context of a "Paramedic".

Hence, each of the audio summarization data 420, 422 comprises a portion of audio summarization data selected (e.g. at the block 308 of the method 300) based on a context of the receiving terminals 111, 112.

It is further understood that the audio summarization data 420, 422 is generated in response to the controller 220 determining (e.g. the block 304 of the method 300) that the signal strength associated with the first network 121 has fallen below a predetermined threshold.

Figure 5:
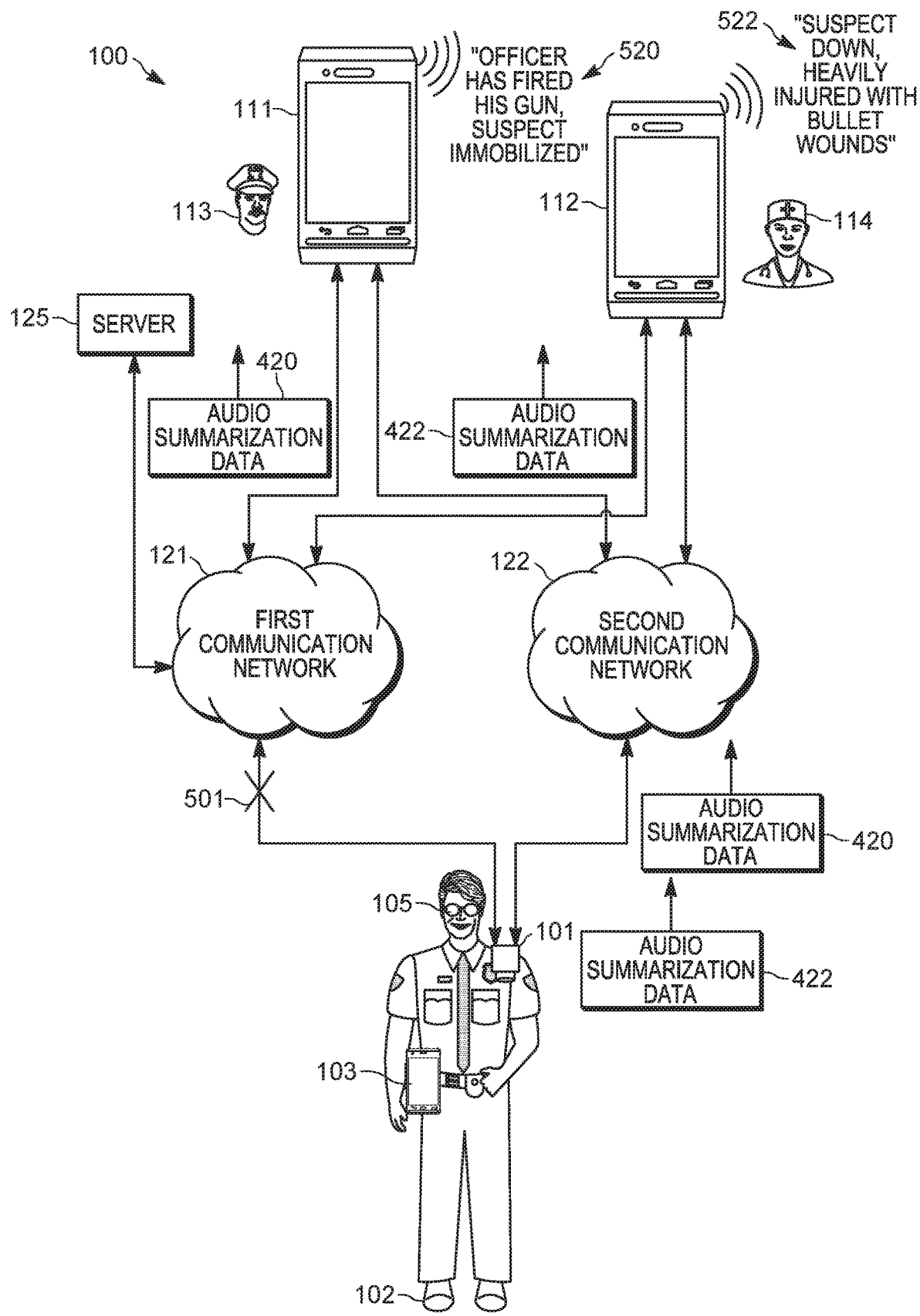
FIG. 5 depicts the system of FIG. 1 implementing a portion of a method for providing audio summarization data from video, in accordance with some examples.

Attention is next directed to FIG. 5 which depicts an example of the blocks 304, 310 of the method 300. FIG. 5 is substantially similar to FIG. 1 with like components having like numbers. In particular, FIG. 5 depicts the signal strength of the first network 121 falling below a predetermined threshold, as represented by the "X" 501 through a communication link between the portable media streaming device 101 and the first network 121. The portable media streaming device 101 responsively determines (e.g. at the block 304 of the method 300) that the signal strength of the first network 121 has fallen below a predetermined threshold, generates the audio summarization data 420, 422 and selects portions thereof based on context as described with reference to FIG. 4.

As depicted in FIG. 5, the portable media streaming device 101 transmits (e.g. at the block 310 of the method 300) the audio summarization data 420 (e.g. associated with a "Police Officer") to the receiving terminal 111 (e.g. also associated with a "Police Officer") via the second network 122; the receiving terminal 111 receives the audio summarization data 420 and "plays" the audio summarization data 420 as sound 520 such that the user 113 hears that the "Officer has fired his gun, suspect immobilized".

As also depicted in FIG. 5, the portable media streaming device 101 transmits (e.g. at the block 310 of the method 300) the audio summarization data 422 (e.g. associated with a "Paramedic") to the receiving terminal 112 (e.g. also associated with a "Paramedic") via the second network 122; the receiving terminal 112 receives the audio summarization data 422 and "plays" the audio summarization data 422 as sound 522 such that the user 114 hears that "Suspect down, Heavily injured with bullet wounds".

In other examples, the audio summarization data 420, 422 may be transmitted on the first network 121.

Hence, each of the users 113, 114 (for example, having lost video from the portable media streaming device 101 due to the first network 121 having lost signal strength at the portable media streaming device 101) hears respective portions of the audio summarization data 420, 422 that provides a summary of what is happening at the scene of an incident where the user 102 is located.

Figure 6:
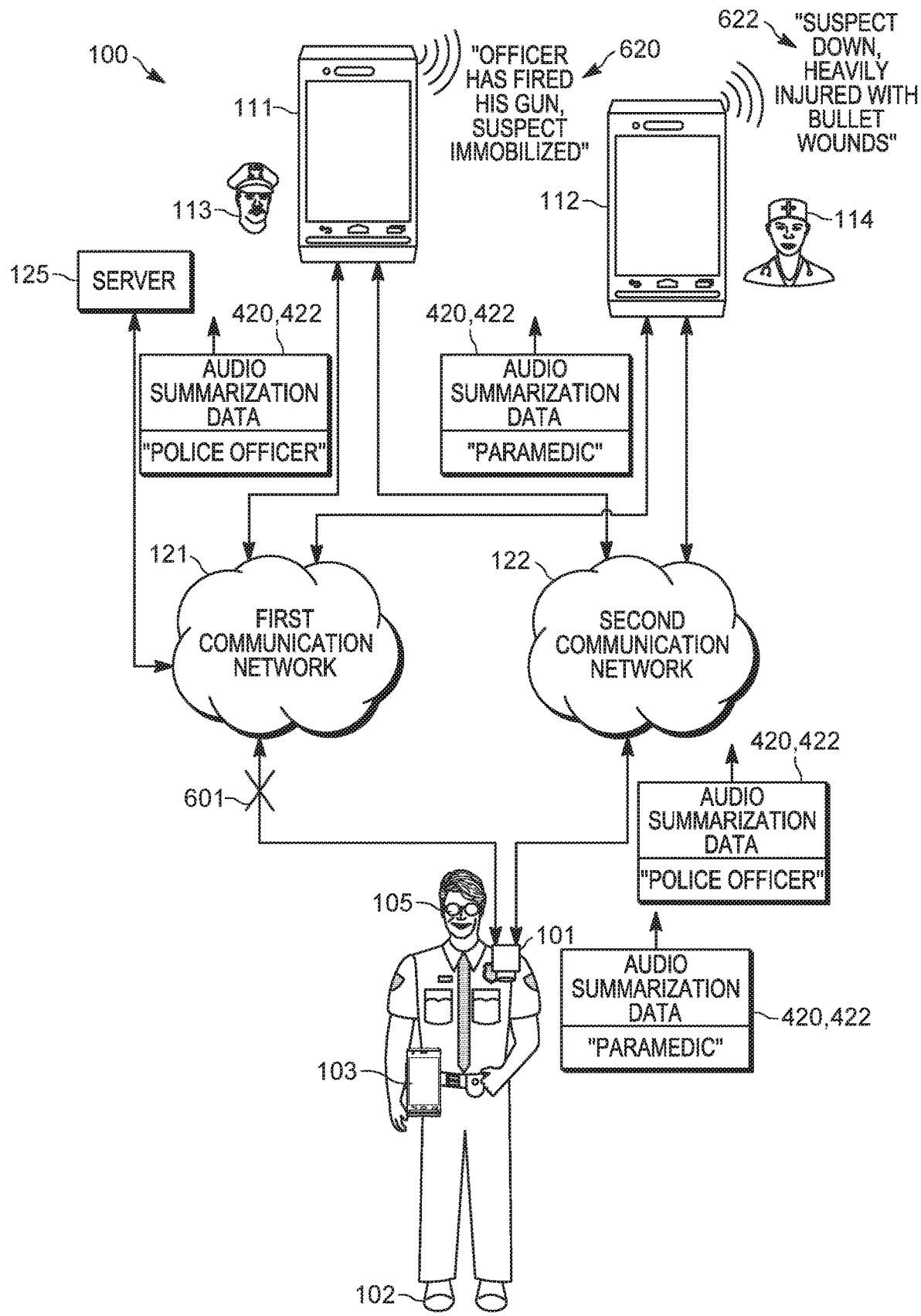
FIG. 6 depicts the system of FIG. 1 implementing a portion of a method for providing audio summarization data from video, in accordance with some alternative examples.

Attention is next directed to FIG. 6 which depicts another example of the blocks 304, 310 of the method 300. FIG. 6 is substantially similar to FIG. 5 with like components having like numbers. As in FIG. 5, the first network 121 falls below a predetermined threshold, as represented by the "X" 601 through a communication link between the portable media streaming device 101 and the first network 121. The portable media streaming device 101 responsively determines (e.g. at the block 304 of the method 300) that the signal strength of the first network 121 has fallen below a predetermined threshold, generates the audio summarization data 420, 422 and selects portions thereof based on context as described with reference to FIG. 4.

However, in FIG. 6, the audio summarization data 420, 422 is transmitted to both receiving terminals 111, 112 with a respective identifier of the context of each of the receiving terminals 111, 112. For example, the audio summarization data 420, 422 is transmitted to the receiving terminal 111 with an identifier "Police Officer", while the audio summarization data 420, 422 is transmitted to the receiving terminal 112 with an identifier "Paramedic". The respective identifiers of "Police Officer" and "Paramedic" are used by each of the receiving terminals 111, 112 to filter the audio summarization data 420, 422. For example, as the audio summarization data 420 includes "Police Audio Summary (Gun Shooting Incident)", and the audio summarization data 422 includes "Paramedic Audio Summary (Man Down Condition)" the receiving terminal 111 filters the audio summarization data 420, 422 on the basis of the identifier "Police Officer" to only play the audio summarization data 420 as sound 620 (similar to the sound 520). Similarly, the receiving terminal 112 filters the audio summarization data 420, 422 on the basis of the identifier "Paramedic" to only play the audio summarization data 422 as sound 622 (similar to the sound 522).

However, in other examples, the text "Police Audio Summary (Gun Shooting Incident)" and Paramedic Audio Summary (Man Down Condition)" respectively of the audio summarization data 420, 422 may be used as identifiers of context each respective set of audio summarization data 420, 422, with the receiving terminals 111, 112 filtering the audio summarization data 420, 422 accordingly.

Provided herein is a device, system and method for providing audio summarization data from video. When a portable media streaming device loses bandwidth via a first network being used to stream video, the portable media streaming device may generate audio summarization data of objects of interest in the video and transmit the audio summarization data in place of the video on the first network or a lower bandwidth second network. The audio summarization data is further selected based on context of receiving terminals so that the receiving terminals only play portions of the audio summarization data that is relevant to their respective contexts.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method of operating a portable media streaming device, the method comprising:
    transmitting, via a first network, using the portable media streaming device, to one or more receiving terminals, first frames of video captured by the portable media streaming device;
    determining, at the portable media streaming device, after transmission of the first frames of the video, that a signal strength associated with the first network falls below a predetermined threshold;
    identifying one or more objects of interest in second frames of the video captured by the portable media streaming deivce after the first frames, the one or more objects identified using one or more of video analytics on the second frames and audio analytics on audio of the second frames;
    after the one or more objects of interest are identified, generating, at the portable media streaming device, audio summarization data corresponding to the one or more objects, the audio summarization data comprising an audio description that describes the one or more objects identified in the second frames of the video;
    selecting, at the portable media streaming device, a portion of the audio summarization data based on a context associated with a receiving terminal of the one or more receiving terminals, the portion of the audio summarization data comprising an identifier of the context; and
    transmitting, via one or more of the first network and a second network, at the portable media streaming device, the portion of the audio summarization data to all of the one or more receiving terminals, the identifier of the context being configured for use in filtering the portion of the audio summarization data at each of the one or more receiving terminals.

2. The method of claim 1, wherein the one or more objects of interest comprises one or more of a person, a given object, and an entity.

3. The method of claim 1, wherein the first network comprises a broadband network and the second network comprises a narrowband network, the first frames of the video transmitted via the broadband network prior to the signal strength associated with the first network falling below the predetermined threshold, and the portion of the audio summarization data transmitted to the receiving terminal via the narrowband network after the signal strength associated with the first network falls below the predetermined threshold.

4. The method of claim 1, further comprising:
selecting, at the portable media streaming device, respective portions of the audio summarization data based on a respective context associated with respective receiving terminals of the one or more receiving terminals; and
transmitting, via one or more of the first network and the second network, at the portable media streaming device, the respective portions of the audio summarization data to the respective receiving terminals.

5. The method of claim 4, wherein at least two of the one or more receiving terminals have different respective contexts such that at least two of the respective portions are different from one another.

6. The method of claim 4, wherein each of the respective portions are customized according to respective contexts of the respective receiving terminals.

7. The method of claim 1, further comprising:
receiving, via the first network, at the portable media streaming device, from a server associated with the one or more receiving terminals, prior to the signal strength associated with the first network falling below the predetermined threshold, the context of the receiving terminal.

8. The method of claim 1, wherein the context comprises a role associated with a user of the receiving terminal.

9. A portable media streaming device comprising:
a communication unit configured to communicate with a first network and a second network; and
a controller in communication with a video camera, the controller configured to:
transmit, using the communication unit, via the first network, to one or more receiving terminals, first frames of video captured by the video camera;
determine, after transmission of the first frames of the video, that a signal strength associated with the first network falls below a predetermined threshold;
identify one or more objects of interest in second frames of the video captured by the video camera after the first frames, the one or more objects identified using one or more of video analytics on the second frames and audio analytics on audio of the second frames;
after the one or more objects of interest are identified, generate audio summarization data corresponding to the one or more objects, the audio summarization data comprising an audio description that describes the one or more objects identified in the second frames of the video;
select a portion of the audio summarization data based on a context associated with a receiving terminal of the one or more receiving terminals, the portion of the audio summarization data comprising an identifier of the context; and
transmit, using the communication unit, via one or more of the first network and a second network, the portion of the audio summarization data to all of the one or more receiving terminals, the identifier of the context being configured for use in filtering the portion of the audio summarization data at each of the one or more receiving terminals.

10. The portable media streaming device of claim 9, wherein the controller is further configured to:
receive, using the communication unit, via the first network, from a server associated with the one or more receiving terminals, prior to the signal strength associated with the first network falling below the predetermined threshold, the context of the receiving terminal.

11. The portable media streaming device of claim 9, wherein the context comprises a role associated with a user of the receiving terminal.

12. The portable media streaming device of claim 9, wherein the one or more objects of interest comprises one or more of a person, a given object, and an entity.

13. The portable media streaming device of claim 9, wherein the first network comprises a broadband network and the second network comprises a narrowband network, the first frames of the video transmitted via the broadband network prior to the signal strength associated with the first network falling below the predetermined threshold, and the portion of the audio summarization data transmitted to the receiving terminal via the narrowband network after the signal strength associated with the first network falls below the predetermined threshold.

14. The portable media streaming device of claim 9, wherein the controller is further configured to:
select respective portions of the audio summarization data based on a respective context associated with respective receiving terminals of the one or more receiving terminals; and
transmit, using the communication unit, via one or more of the first network and the second network, the respective portions of the audio summarization data to the respective receiving terminals.

15. The portable media streaming device of claim 14, wherein at least two of the one or more receiving terminals have different respective contexts such that at least two of the respective portions are different from one another.

16. The portable media streaming device of claim 14, wherein each of the respective portions are customized according to respective contexts of the respective receiving terminals.

* * * * *